(12) United States Patent
Katagiri et al.

(10) Patent No.: US 10,621,776 B2
(45) Date of Patent: Apr. 14, 2020

(54) INFORMATION DISPLAY APPARATUS THAT CHANGES A VIRTUAL IMAGE DIFFERENTLY FROM A DEGREE OF THE CHANGE DEPTH

(71) Applicant: Ricoh Company, Ltd., Tokyo (JP)

(72) Inventors: Keita Katagiri, Tokyo (JP); Kenichiroh Saisho, Tokyo (JP); Masato Kusanagi, Tokyo (JP); Hiroshi Yamaguchi, Tokyo (JP); Yuuki Suzuki, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/046,203

(22) Filed: Jul. 26, 2018

(65) Prior Publication Data

US 2018/0330539 A1 Nov. 15, 2018

Related U.S. Application Data

(63) Continuation of application No. PCT/JP2017/003780, filed on Feb. 2, 2017.

(30) Foreign Application Priority Data

Feb. 8, 2016 (JP) .................. 2016-021593

(51) Int. Cl.
*G06T 15/50* (2011.01)
*B60K 35/00* (2006.01)
(Continued)

(52) U.S. Cl.
CPC .............. *G06T 15/50* (2013.01); *B60K 35/00* (2013.01); *G02B 27/01* (2013.01); *G06F 3/147* (2013.01);
(Continued)

(58) Field of Classification Search
CPC ....... G06T 11/60; G06T 15/50; G06T 19/006; G06F 3/147; G08G 1/0962; G08G 1/166;
(Continued)

(56) References Cited

U.S. PATENT DOCUMENTS 7,616,364 B2 11/2009 Saisho et al.
7,672,032 B2 3/2010 Hayashi et al.
(Continued)

FOREIGN PATENT DOCUMENTS

EP 1 785 326 A1 5/2007
EP 2944986 A1 11/2015
(Continued)

OTHER PUBLICATIONS

Partial Supplementary European Search Report dated Feb. 1, 2019 in Patent Application No. 17750152.5, 15 pages.
(Continued)

*Primary Examiner* — Jacinta M Crawford
(74) *Attorney, Agent, or Firm* — Xsensus LLP

(57) ABSTRACT

An information display apparatus irradiates a transmissive reflection member with light for forming an image so as to make a virtual image of the image visible on the transmissive reflection member. The information display apparatus includes a memory, and a processor coupled to the memory and configured to control, upon a change in depth of a scene position at which to superimpose the virtual image, a degree of change in a part or an entirety of the virtual image to be displayed, differently from a degree of the change in depth.

18 Claims, 10 Drawing Sheets

(51) Int. Cl.
*G02B 27/01* (2006.01)
*G06T 11/60* (2006.01)
*G06T 19/00* (2011.01)
*G08G 1/0962* (2006.01)
*G09G 5/00* (2006.01)
*G08G 1/16* (2006.01)
*G06F 3/147* (2006.01)

(52) U.S. Cl.
CPC ............ *G06T 11/60* (2013.01); *G06T 19/006* (2013.01); *G08G 1/0962* (2013.01); *G08G 1/166* (2013.01); *G09G 5/00* (2013.01); *B60K 2370/1529* (2019.05); *B60K 2370/177* (2019.05); *B60K 2370/179* (2019.05); *B60K 2370/194* (2019.05); *B60K 2370/31* (2019.05); *B60K 2370/334* (2019.05); *B60K 2370/347* (2019.05); *G02B 2027/014* (2013.01); *G02B 2027/0129* (2013.01); *G02B 2027/0138* (2013.01); *G09G 2320/0261* (2013.01); *G09G 2320/0693* (2013.01); *G09G 2340/12* (2013.01); *G09G 2380/10* (2013.01)

(58) Field of Classification Search
CPC ............ G02B 27/01; G02B 2027/0129; G02B 2027/0138; G02B 2027/014; G09G 5/00; G09G 2320/0261; G09G 2320/0693; G09G 2340/12; G09G 2380/10; B60K 35/00; B60K 2370/1529; B60K 2370/177; B60K 2370/179; B60K 2370/194; B60K 2370/31; B60K 2370/334; B60K 2370/347
USPC .................................................. 345/418, 419
See application file for complete search history.

(56) References Cited

U.S. PATENT DOCUMENTS

| | | | |
|---|---|---|---|
| 7,688,491 B2 | 3/2010 | Saisho et al. | |
| 7,817,177 B2 | 10/2010 | Hayashi et al. | |
| 7,876,486 B2 | 1/2011 | Saisho et al. | |
| 8,045,248 B2 | 10/2011 | Watanabe et al. | |
| 8,059,149 B2 | 11/2011 | Saisho et al. | |
| 8,213,067 B2 | 7/2012 | Saisho | |
| 8,368,736 B2 | 2/2013 | Saisho et al. | |
| 8,451,111 B2 | 5/2013 | Sasaki et al. | |
| 8,531,766 B2 | 9/2013 | Tokita et al. | |
| 8,559,053 B2 | 10/2013 | Saisho et al. | |
| 8,848,013 B2 | 9/2014 | Saisho et al. | |
| 8,876,294 B2 | 11/2014 | Saisho et al. | |
| 8,884,975 B2 | 11/2014 | Satoh et al. | |
| 9,158,124 B2 | 10/2015 | Saisho et al. | |
| RE45,918 E | 3/2016 | Saisho et al. | |
| 9,686,480 B2 | 6/2017 | Kusanagi | |
| 9,798,140 B2 | 10/2017 | Inamoto et al. | |
| 2004/0017282 A1 | 1/2004 | Eguchi et al. | |
| 2007/0106475 A1 | 5/2007 | Kondoh | |
| 2014/0097968 A1 | 4/2014 | Kamiya et al. | |
| 2014/0176350 A1 | 6/2014 | Niehsen et al. | |
| 2015/0015712 A1 | 1/2015 | Sempuku | |
| 2016/0159280 A1 | 6/2016 | Takazawa et al. | |
| 2016/0161833 A1 | 6/2016 | Watanabe et al. | |
| 2016/0170487 A1 | 6/2016 | Saisho | |
| 2016/0313562 A1 | 10/2016 | Saisho et al. | |
| 2016/0334637 A1 | 11/2016 | Saisho et al. | |
| 2017/0084176 A1 | 3/2017 | Nakamura | |
| 2017/0134662 A1 | 5/2017 | Kosaka et al. | |

FOREIGN PATENT DOCUMENTS

| | | |
|---|---|---|
| EP | 2945000 A1 | 11/2015 |
| EP | 2945001 A1 | 11/2015 |
| JP | 2002-46501 A | 2/2002 |
| JP | 2004-058828 | 2/2004 |
| JP | 2007-153307 | 6/2007 |
| JP | 2009-244355 | 10/2009 |
| JP | 2010-188811 | 9/2010 |
| JP | 4852062 | 1/2012 |
| JP | 2013-257574 | 12/2013 |
| JP | 2014-075079 | 4/2014 |
| JP | 2014-115670 | 6/2014 |
| JP | 2014-139655 | 7/2014 |
| JP | 2014-139656 | 7/2014 |
| JP | 2014-139657 | 7/2014 |
| JP | 2015-049266 | 3/2015 |
| JP | 2015-104930 | 6/2015 |
| JP | 2015-108838 | 6/2015 |
| JP | 2015-148664 | 8/2015 |
| JP | 2015-221633 | 12/2015 |
| JP | 2015-232691 | 12/2015 |
| JP | 2015-232692 | 12/2015 |
| JP | 2015-232693 | 12/2015 |
| JP | 2016-107945 | 6/2016 |
| WO | 2015/001796 A1 | 1/2015 |
| WO | 2015/029598 A1 | 3/2015 |
| WO | WO 2015/146619 A1 | 10/2015 |
| WO | 2016/002006 A1 | 1/2016 |

OTHER PUBLICATIONS

International Search Report dated Apr. 25, 2017 in PCT/JP2017/003780 filed on Feb. 2, 2017.
Written Opinion dated Apr. 25, 2017 in PCT/JP2017/003780 filed on Feb. 2, 2017.

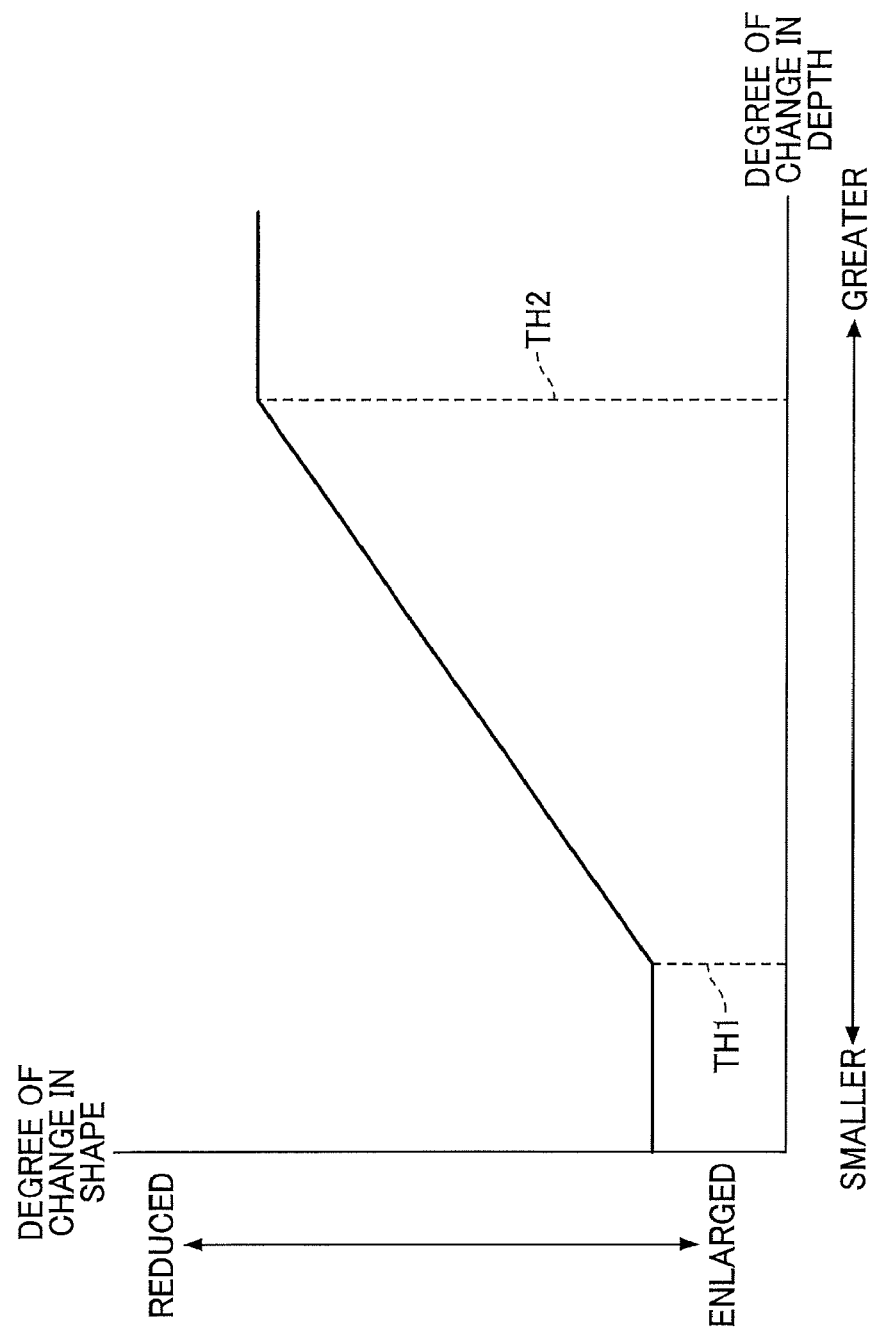

INFORMATION DISPLAY APPARATUS THAT CHANGES A VIRTUAL IMAGE DIFFERENTLY FROM A DEGREE OF THE CHANGE DEPTH

CROSS-REFERENCE TO RELATED APPLICATIONS

The present application is a continuation application of International Application No. PCT/JP2017/003780, filed on Feb. 2, 2017, which claims priority to Japanese Patent Application No. 2016-021593 filed on Feb. 8, 2016. The contents of these applications are incorporated herein by reference in their entirety.

BACKGROUND OF THE INVENTION

1. Field of the Invention

The disclosures herein generally relate to an information display apparatus.

2. Description of the Related Art

Conventionally, in an in-vehicle head-up display, a virtual image (such as symbols and characters) is superimposed and displayed on a windshield only by taking into account a two-dimensional position on the windshield without taking into account spatial consistency with a scene. Therefore, for information correlated with a scene, it takes time for a viewer to visually recognize such information because a virtual image does not match an actual position in the scene.

In light of the above, a technique has been proposed that allows a viewer to easily correlate information with a scene by taking into account spatial consistency with a scene viewed in front of a vehicle, such that a virtual image is presented to a viewer as if the virtual image were a part of the scene.

As an example, a technique that projects an image to one of an observer's eyes such that the image is superimposed on a background through a semi-transmissive reflection member is known. This technique utilizes an image generating unit to generate a plurality of images having varying sizes of symbols, such that perception positions of the displayed images are sequentially moved in a direction farther from an observer's position (see Patent Document 1, for example)

However, in such a conventional technique, when a virtual image is formed, the virtual image is enlarged or reduced in accordance with a change in three-dimensional space of a scene, especially in accordance with a change in depth of a front scene viewed form a viewpoint of a viewer. Therefore, there is a problem in that, depending on a position in a scene on which a virtual image is superimposed, the virtual image is significantly deformed, causing a viewer's visibility to be impaired.

RELATED-ART DOCUMENTS

[Patent Document 1] Japanese Unexamined Patent Application Publication No. 2009-244355

SUMMARY OF THE INVENTION

According to an aspect of at least one embodiment, an information display apparatus irradiates a transmissive reflection member with light for forming an image so as to make a virtual image of the image visible on the transmissive reflection member. The information display apparatus includes a memory, and a processor coupled to the memory and configured to control, upon a change in depth of a scene position at which to superimpose the virtual image, a degree of change in a part or an entirety of the virtual image to be displayed, differently from a degree of the change in depth.

BRIEF DESCRIPTION OF THE DRAWINGS

FIG. 13 is a graph for explaining a correlation between a degree of change in depth of a scene position and a degree of change in shape of a virtual image.

DESCRIPTION OF THE PREFERRED EMBODIMENTS

Figure 1:
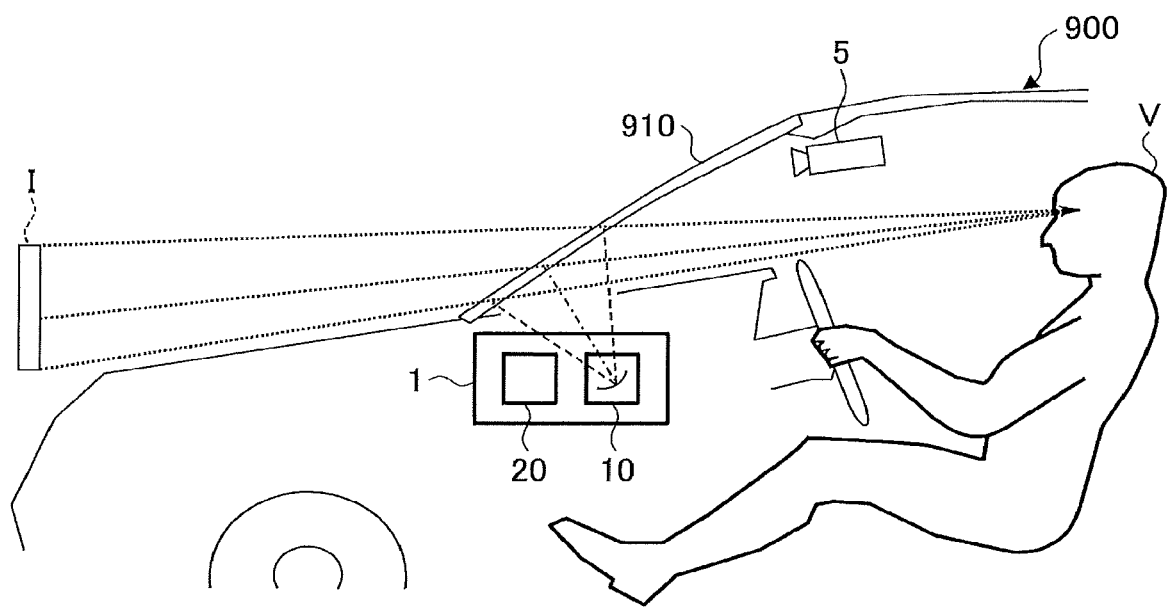
FIG. 1 is a schematic diagram illustrating an information display apparatus according to a first embodiment.

In the following, embodiments of the present invention will be described with reference to the accompanying drawings. In the drawings, the same elements are denoted by the same reference numerals and a duplicate description thereof may be omitted.

It is a general object of at least one embodiment to provide an information display apparatus that can display a virtual image without impairing a viewer's visibility.

First Embodiment

[Overview of Information Display Apparatus]

FIG. 1 is a schematic diagram illustrating an information display apparatus according to a first embodiment. Referring to FIG. 1, an information display apparatus 1 is installed in a reference vehicle 900. The information display apparatus 1 is what is known as a head-up display (hereinafter referred to as a HUD) having functions for projecting a predetermined image onto a front windshield 910 in front of a viewer V and superimposing and displaying the predetermined image as a virtual image I in the visual field of the viewer V. Herein, the viewer V is a driver who is an occupant of the reference vehicle 900. The front windshield 910 also functions as a transmissive reflection member that transmits part of incident light and reflects at least part of the rest of the incident light.

The information display apparatus 1 may be disposed at any position according to interior design of the reference vehicle 900. For example, the information display apparatus 1 may be disposed on a dashboard of the reference vehicle 900, or may be embedded in the dashboard of the reference vehicle 900. The information display apparatus 1 includes an optical unit 10 and an electronic unit 20 as main elements.

In the present embodiment, although an example in which the information display apparatus 1 is installed in the reference vehicle 900 is illustrated, the present invention is not limited to this example. For example, the information display apparatus 1 may be installed in a moving object such as a vehicle, an aircraft, a ship, and an industrial robot, and makes navigation information required for the steering of the moving object visible on a front windshield of the moving object. As used herein, the navigation information is information such as a speed of the moving object, a travelling direction, a distance to a destination, a name of a current location, a presence or a position of an object (a real object) in front of the moving object, signs such as speed limits, and traffic congestion information, for example.

As a projection method of the information display apparatus 1, a panel method and a laser scanning method may be employed. The panel method is a method for forming an intermediate image by using an imaging device such as a liquid crystal panel, a digital mirror device (DMD) panel, and a vacuum fluorescent display (VFD). The laser scanning method is a method for forming an intermediate image by scanning a laser beam emitted from a laser beam source by using a two-dimensional scanning device.

Unlike the panel method that forms an image by emitting light to a panel while partially blocking the light emitted to the panel, the laser scanning method forms an image by assigning light emission and non-light emission for each pixel, allowing a high-contrast image to be formed. Thus, the laser scanning method is preferable. In the present embodiment, the information display apparatus 1 employs the laser scanning method as a projection method, but the present invention is not limited thereto.

In FIG. 1, an information acquisition unit 5 may obtain background luminance of an area in which the virtual image I is displayed, and send the background luminance to the information display apparatus 1. However, the information acquisition unit is not an element of the information display apparatus 1.

The information acquisition unit 5 is disposed in such a manner that captures an angle of view of a scene in front of the reference vehicle 900, including a scene overlapped with the virtual image I when viewed from the viewer V. The information acquisition unit 5 may be disposed at any position according to interior design of the reference vehicle 900. For example, the information acquisition unit 5 may be disposed on a ceiling of the reference vehicle 900. Alternatively, the information acquisition unit 5 may be disposed on the dashboard of the reference vehicle 900.

The information acquisition unit 5 is, for example, a monocular camera, a compound-eye camera (stereo camera), or an omnidirectional camera generating a synthetic image from a plurality of camera images. In addition to obtaining the background luminance, the information acquisition unit 5 may also function as a drive recorder or a sensing device. Example applications of the sensing device include detecting preceding vehicles, people, and signs, and also detecting distances to obstacles.

In other words, the information acquisition unit 5 is not necessarily provided for exclusive use of the information display apparatus 1. For example, an information acquisition unit used for a drive recorder may be utilized. Note that providing the information acquisition unit 5 for exclusive use of the information display apparatus 1 is not negated.

Figure 2:
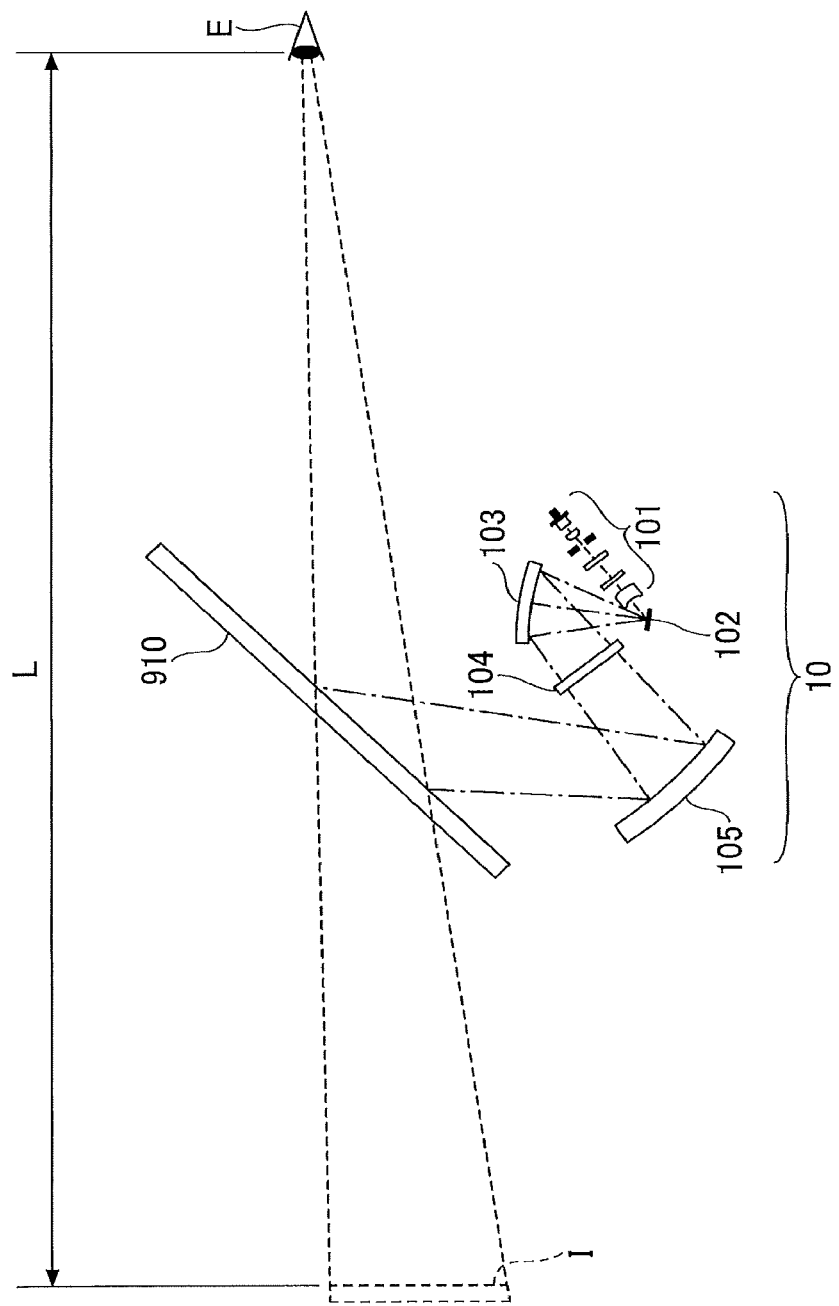
FIG. 2 is a diagram illustrating a configuration of an optical unit of the information display apparatus according to the first embodiment.

FIG. 2 is a diagram illustrating a configuration of the optical unit of the information display apparatus according to the first embodiment. Referring to FIG. 2, the optical unit 10 generally includes a light source unit 101, an optical deflector 102, a mirror 103, a screen 104, and a concave mirror 105.

By emitting light for forming an image (image light) from the optical unit 10 toward the front windshield 910, a virtual image I of the image can be made visible from a viewpoint position E (a middle point between the right and left eyes) of the viewer V. Namely, the viewer V can visually identify an image (an intermediate image) formed on the screen 104 as a virtual image I through the front windshield 910. This intermediate image is an information provision image for providing information to the viewer V.

A configuration example of the optical unit 10 will be described below. The light source unit 101 includes three red, green, and blue laser beam sources (hereinafter referred to as LDs), a coupling lens, an aperture, a synthesizing element and a lens, for example. Laser beams emitted from the three LDs are synthesized, and the synthesized laser beam is directed toward a reflective surface of the optical deflector 102. The synthesized laser beam directed toward the reflective surface of the optical deflector 102 is two-dimensionally scanned by the optical deflector 102.

As the optical deflector 102, a single micro-mirror that oscillates around two axes orthogonal to each other and two micro-mirrors that oscillate or rotate around a single axis may be used, for example. The optical deflector 102 may be a microelectromechanical systems (MEMS) device manufactured by a semiconductor process, for example. The optical deflector 102 may be driven by an actuator that uses deformation of piezoelectric elements as a driving force. As the optical deflector 102, a galvanometer mirror and a polygon mirror may be used, for example.

The laser beam two-dimensionally deflected by the optical deflector 1022 enters the mirror 103 and is reflected by the mirror 103. Accordingly, a two-dimensional image (an intermediate image) is projected onto a surface (a scan surface) of the screen 104. As the mirror 103, a concave mirror may be used, for example. A convex mirror or a plane mirror may also be used. As the screen 104, it is preferable to use a microlens array or a micro-mirror array having a function for diverging a laser beam at a desired angle of divergence. A diffusing plate for diffusing a laser beam, or a transmission plate or a reflection plate having a smooth surface may also be used.

The laser beam emitted from the screen 104 is reflected by the concave mirror 105 and enters the front windshield 910. Part of light flux incident on the windshield 910 is transmitted through the windshield 910 and at least part of the rest of the light flux is reflected toward the viewpoint position E. As a result, the viewer V can visually identify an enlarged virtual image I through the front windshield 910. Namely, when viewed from the viewer V, the virtual image I is enlargedly displayed through the front windshield 910.

Typically, the front windshield 910 is not flat, but is slightly curved. Therefore, an image forming position of the virtual image I is determined by both the concave mirror 105 and the curved surface of the front windshield 910. The converging power of the concave mirror 105 is preferably set such that the virtual image I is formed at a position (a depth position) greater than or equal to 4 m to less than or equal to 10 m (preferably less than or equal to 6 m) away from the viewpoint position E of the viewer V.

Further, at least one of the mirror 103 and the concave mirror 105 is preferably designed and arranged so as to correct optical distortion caused by the shape of the front windshield 910. Such optical distortion causes a horizontal line of an intermediate image to become upwardly or downwardly convex due to the slightly curved front windshield 910.

Further, a combiner may be provided as a transmissive reflection member on the viewpoint position E side relative to the front windshield 910. Similarly to a case in which the front windshield 910 is irradiated with light from the concave mirror 105, a virtual image I may be displayed by irradiating the combiner with light from the concave mirror 105.

Figure 3:
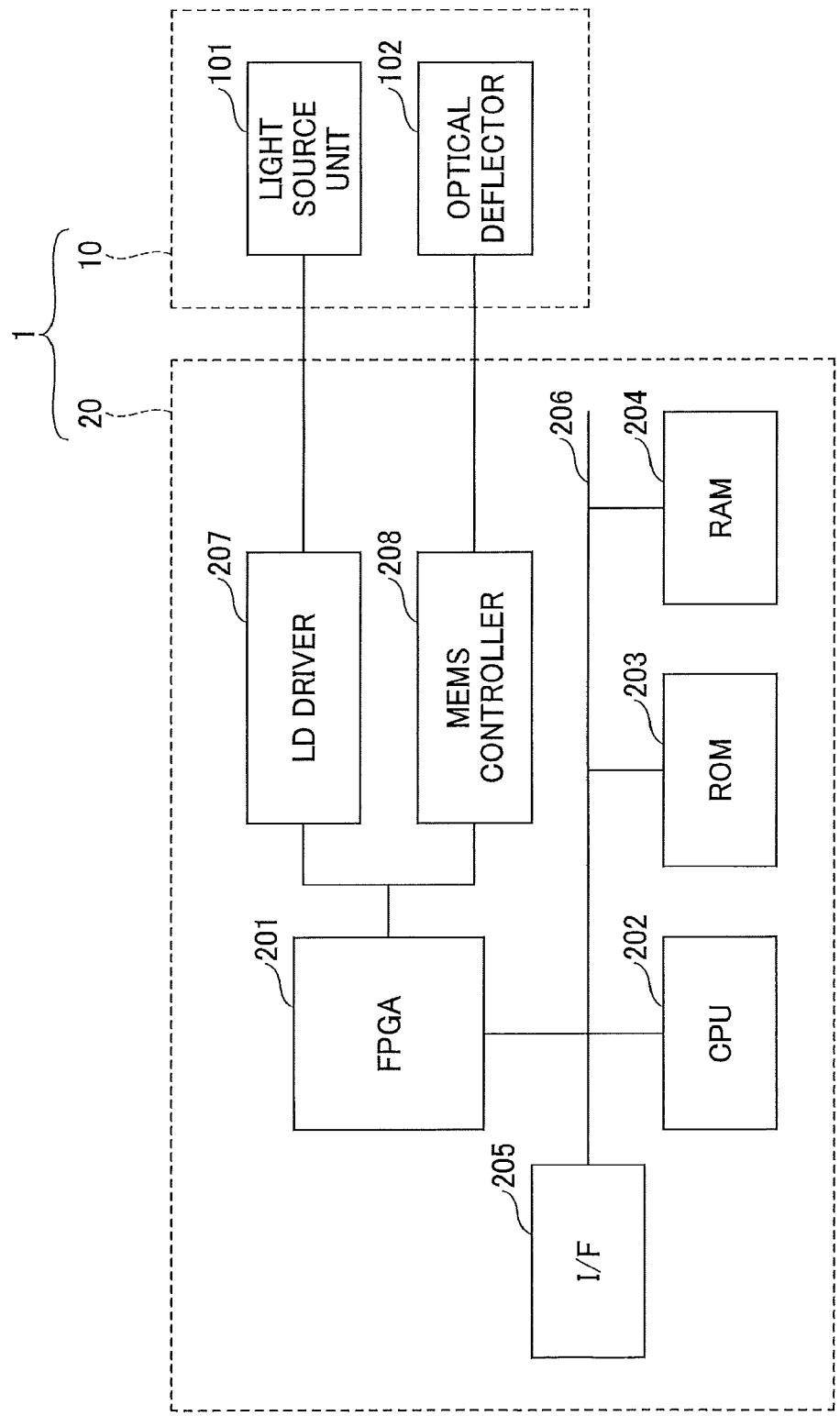
FIG. 3 is a block diagram illustrating a hardware configuration of the information display apparatus according to the first embodiment.

FIG. 3 is a block diagram illustrating a hardware configuration of the information display apparatus according to the first embodiment. Referring to FIG. 3, the electronic unit 2 includes a field-programmable gate array (FPGA) 201, a central processing unit (CPU) 202, read-only memory (ROM) 203, random access memory (RAM) 204, an interface (I/F) 205, a bus-line 206, a laser diode (LD) driver 207, and a micro-electro-mechanical systems (MEMS) controller 208. The FPGA 201, the CPU 202, the ROM 203, the RAM 204, and the I/F 205 are coupled to each other via the bus-line 206.

The FPGA 201 drives the LDs of the light source unit 101 of the optical unit 10 by means of the LD driver 207. Furthermore, the FPGA 201 drives the optical deflector 102 of the optical unit 10 by means of the MEMS controller 208.

The CPU 202 controls functions of the information display apparatus 1. The ROM 203 stores programs executed by the CPU 202 to control the functions of the information display apparatus 1. The RAM 204 is used as a work area of the CPU 202. The I/F 205 is an interface for communicating with an external controller and the like. For example, the I/F 205 is coupled to a Controller Area Network (CAN) of the vehicle.

Figure 4:
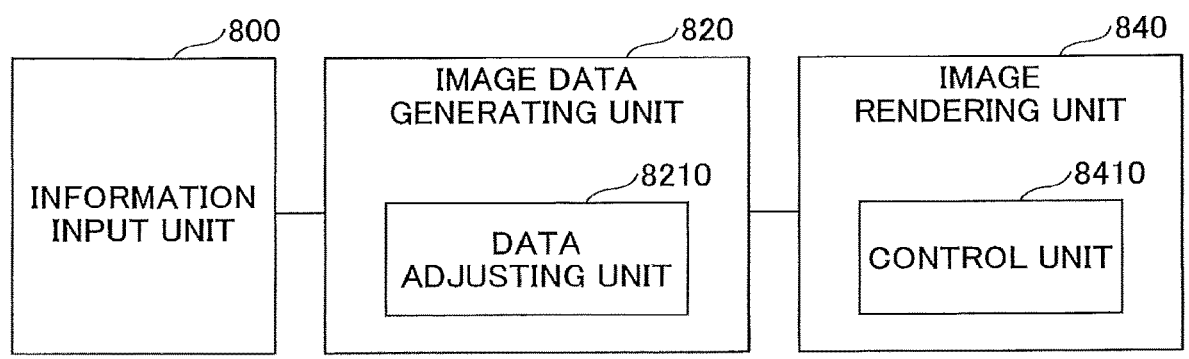
FIG. 4 is a block diagram illustrating functions of the information display apparatus according to the first embodiment.

FIG. 4 is a block diagram illustrating functions of the information display apparatus according to the first embodiment. Referring to FIG. 4, the information display apparatus 1 includes an information input unit 800, an image data generating unit 820, and an image rendering unit 840.

Information from the information acquisition unit 5 is received by (input into) the information input unit 800. The information input unit 800 may receive information in a wired or wireless manner. For example, information relating to a vehicle (information such as a speed and a travel distance) from the CAN or external information (information such as navigation information or traffic information from the global positioning system (GPS)) may be input in the information input unit 800. Information input in the information input unit 800 may include at least one of a position, a size, a shape, a color, and brightness of a real object such as a preceding vehicle.

The image data generating unit 820 generates image data representing an image to be rendered, based on information input in the information input unit 800. The image data generating unit 820 includes a data adjusting unit 8210. When the image data is generated, the data adjusting unit 8210 may adjust at least one of a position, a size, a shape, a color, and brightness (luminance) of a virtual image to be displayed.

The image rendering unit 840 includes a control unit 8410. The control unit 8410 controls the optical unit 10 in accordance with the image data, thereby irradiating the front windshield 910 with light. As a result, a virtual image I can be made visible from the viewpoint position E of the viewer V.

[Three-Dimensional Display]

Typically, people perceive the depth of space based on two-dimensional visual performance in a visual field (i.e., pictorial cues), a difference in visual performance between eyes and focus adjustment of eyes (i.e., oculomotor cues), and a change in visual performance of an object when a viewpoint moves (i.e., motion parallax). Among them, by mainly using the pictorial cues, the information display apparatus 1 can display information as a virtual image such that the virtual image can be perceived as existing at a position in real space.

When an object exists in real space, as the distance between the object and a viewer becomes nearer, the appearance size of the object viewed from the viewer becomes greater. Further, as the distance between the object and the viewer becomes nearer, the object is viewed at a lower portion of the visual field of the viewer. Further, for a far distant object, the object may be viewed faintly from the viewer due to the density of air.

In the information display apparatus 1, a virtual image is displayed by being superimposed on a front scene viewed from the viewer. Therefore, by adjusting a geometric shape of display information of the virtual image (geometric conversion) so as to match the real space, the display information can be three-dimensionally displayed. Namely, by using the above-described depth perception of a human, the information display apparatus 1 allows the display information to be perceived (as an illusion) as existing in three dimensions at a position in the real space when viewed from the viewer.

In this way, it is possible to enhance visibility of display information by displaying the display information that three-dimensionally matches a real object existing around a reference vehicle when viewed from the viewer. Further, a virtual image that three-dimensionally matches a real object existing around the reference vehicle when viewed from the viewer, and a virtual image that does not three-dimensionally match a real object existing around the reference vehicle when viewed from the viewer may also be simultaneously displayed in a display area.

A display image (a virtual image) of the information display apparatus 1 is projected onto a two-dimensional position that is determined at the design phase. Therefore, even if a shape and a color of the display image is adjusted such that the display image is viewed as existing at a position in real space (for example, on a road surface in front of the viewpoint of the viewer), a difference of view according to the position where the virtual image is displayed, such as parallax, appears in the retinas of the left and right eyes of the viewer.

Figure 5:
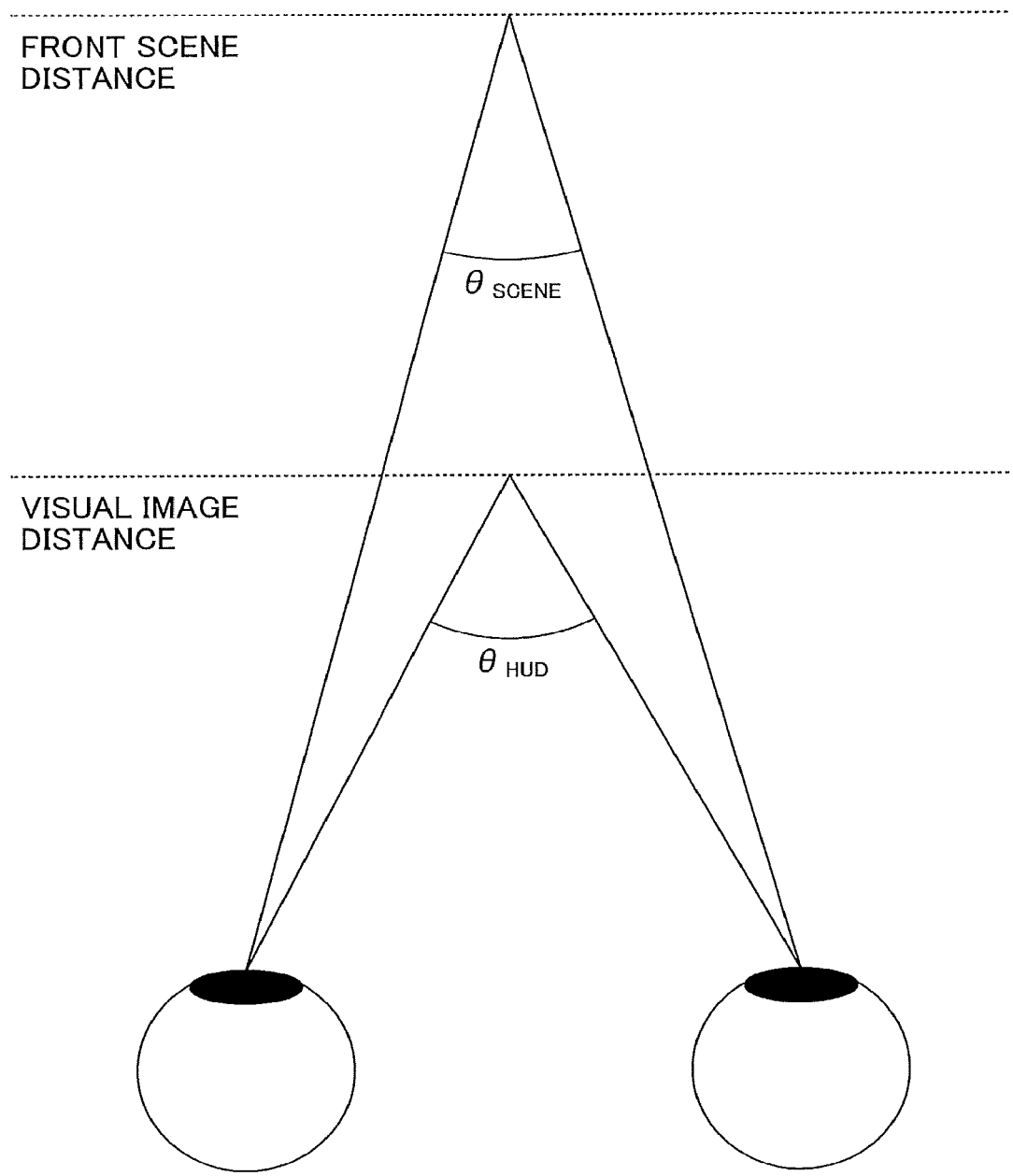
FIG. 5 is a diagram for explaining a parallax angle.

As illustrated in FIG. 5, $\theta_{SCENE}$ denotes an angle (convergence angle) formed by lines of sight of a viewer's both eyes, which represents parallax when the viewer views a far point in a front scene. $\theta_{HUD}$ denotes an angle formed by lines of sight of the viewer's both eyes, which represents parallax when the viewer views a virtual image displayed by the information display apparatus 1. In this case, $|\theta_{HUD}-$ $\theta_{SCENE}|$ is defined as a parallax angle. In general, the convergence angle refers to an angle formed by lines of sight of a viewer's both eyes when the viewer views a target object.

When the "parallax angle" exceeds 1 degree, the viewer may perceive a double image, giving the viewer a feeling of fatigue and discomfort. Therefore, the information display apparatus 1 is preferably designed to set the "parallax angle" to less than or equal to 1 degree. For example, in the information display apparatus 1, when the distance L (FIG. 2) is set to be in a range from 4 m to 6 m with the parallax angle being set to less than or equal to 1 degree, the viewer can perceive a virtual image without parallax while viewing an object existing in a front scene even if the object exists at a distance of 1000 m ahead.

[Change in Depth of Scene and Control of Virtual Image]

In a case where the information display apparatus 1 controls, upon a change in depth of a scene position at which to superimpose a virtual image, the virtual image always in accordance with the change in depth of the scene viewed from a viewer's viewpoint, the viewer's visibility may be impaired depending on the superimposed position of the virtual image. Therefore, in the present embodiment, upon a change in depth of a scene position at which to superimpose a virtual image, a degree of change in a part or the entirety of the virtual image to be displayed is changed, differently from a degree of the change in depth of the scene position. This will be described with reference to the drawings. The term "depth of a scene position at which to superimpose a virtual image" refers to a distance between a viewpoint of a viewer and a scene position where a virtual image is superimposed.

Figure 6:
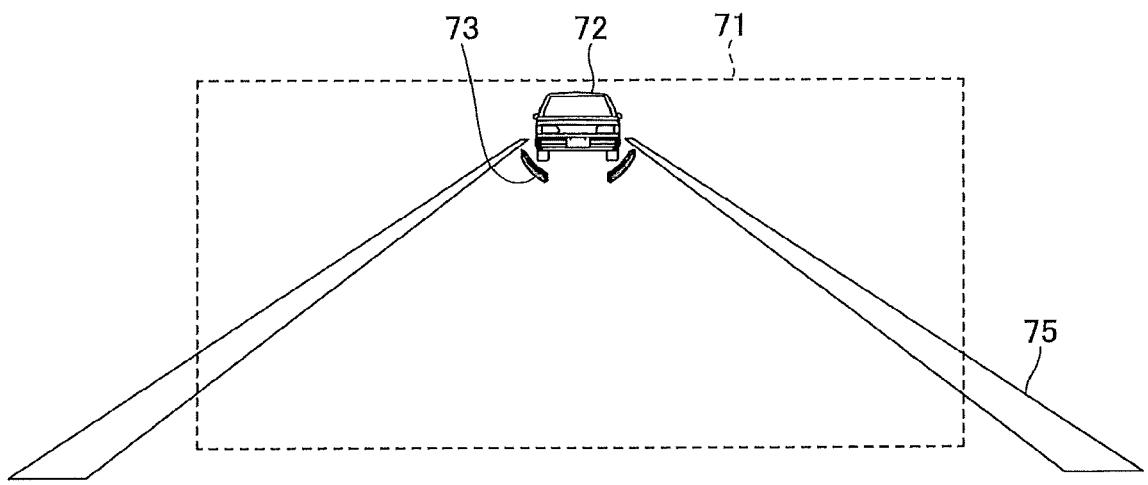
FIG. 6 is a diagram (part 1) for explaining a virtual image displayed when depth of a superimposed position in a scene is greater.
Figure 7:
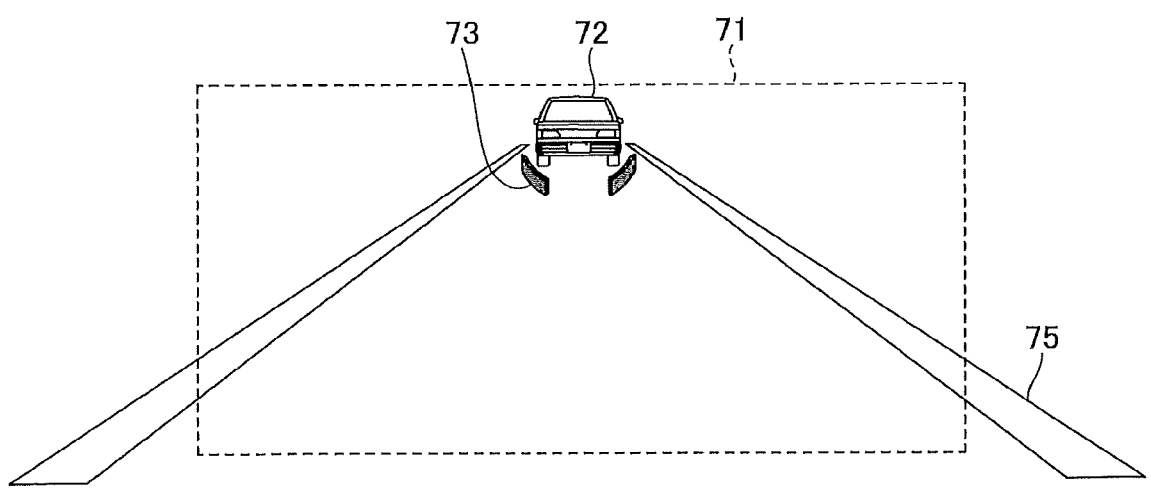
FIG. 7 is a diagram (part 2) for explaining the virtual image displayed when the depth of the superimposed position in the scene is greater.

FIG. 6 and FIG. 7 are diagrams for explaining a virtual image displayed when depth of a superimposed position in a scene is greater. Further, FIG. 6 and FIG. 7 each illustrate an exemplary situation in which a marker, which follows a vehicle ahead of a reference vehicle viewed from a viewer (driver) through the HUD, is projected as a virtual image.

In FIG. 6 and FIG. 7, a marker 73 follows, within a display area 71 of a windshield where a virtual image can be projected, a preceding vehicle travelling on a road 75 in the same lane as a reference vehicle.

In FIG. 6, a change in a width in a vertical direction of the marker 73 is made at the same degree (the rate of change) as a degree of change in depth of the preceding vehicle 72, such that a degree of the change in the width dimension of the superimposed marker 73 is changed in accordance with the degree of the change in depth of the preceding vehicle 72 (noting that a width in a horizontal direction of the marker 73 is changed in accordance with a width of the preceding vehicle 72).

In FIG. 7, the degree of the change in the dimension of the superimposed marker 73 is made smaller than the degree of the change in depth of the preceding vehicle 72, such that the rate of change in the dimension of the marker 73 decreases. As a result, the marker 73 illustrated in FIG. 7 is made wider than the marker 73 illustrated in FIG. 6 (noting that the width in the horizontal direction of the marker 73 is changed in accordance with the width of the preceding vehicle 72). Therefore, as compared to FIG. 6, FIG. 7 makes it easier for the viewer to visually keep track of the preceding vehicle.

Figure 8:
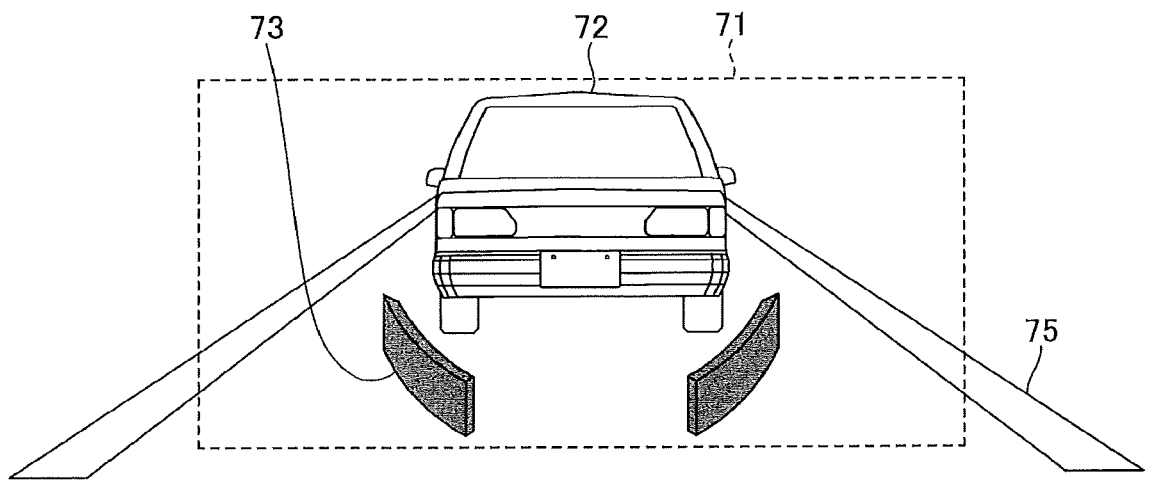
FIG. 8 is a diagram (part 1) for explaining the virtual image displayed when the depth of the superimposed position in the scene is smaller.
Figure 9:
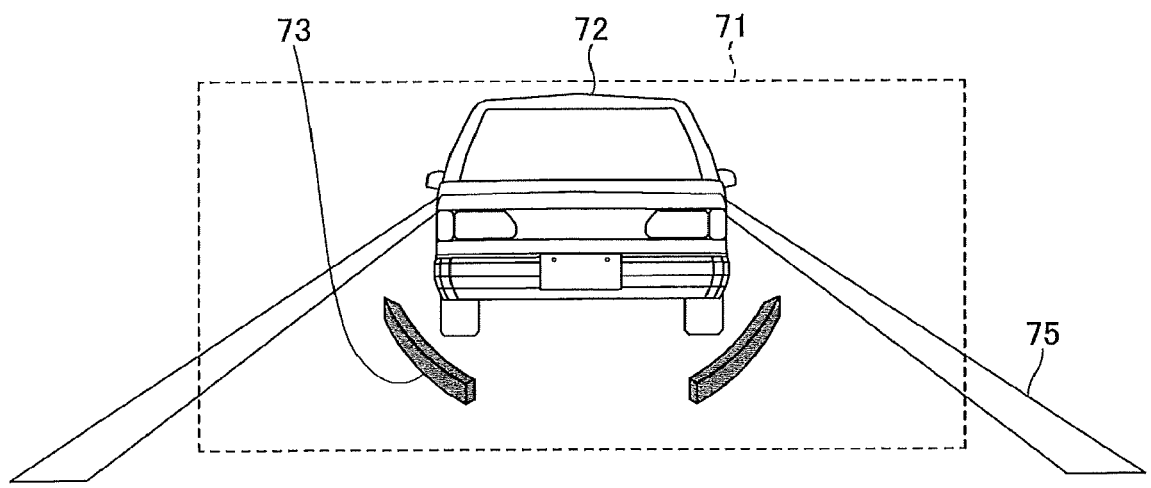
FIG. 9 is a diagram (part 2) for explaining the virtual image displayed when the depth of the superimposed position in the scene is smaller.

FIG. 8 and FIG. 9 are diagrams for explaining the virtual image displayed when the depth of the superimposed position in the scene is smaller. Similarly to FIG. 6 and FIG. 7, FIG. 8 and FIG. 9 each illustrate an exemplary situation in which a marker, which follows the preceding vehicle of the reference vehicle viewed from the viewer (driver) through the HUD, is projected as the virtual image.

In FIG. 8, the width in the vertical direction of the marker 73 is changed at the same degree (the rate of change) as a degree of change in depth of the preceding vehicle 72, such that the degree of change in the size of the superimposed marker 73 is changed in accordance with the degree of the change in depth of the preceding vehicle 72 (noting that the width in the horizontal direction of the marker 73 is changed in accordance with the width of the preceding vehicle 72).

In FIG. 9, the degree of change in the size of the superimposed marker 73 is made smaller than the degree of the change in depth of the preceding vehicle 72, such that the rate of change in the size of the marker 73 decreases. As a result, the marker 73 illustrated in FIG. 9 is made narrower than the marker 73 illustrated in FIG. 8 (noting that the width in the horizontal direction of the marker 73 is changed in accordance with the width of the preceding vehicle 72). Therefore, FIG. 9 can reduce a possibility of attracting the viewer's (driver's) attention more than necessary due to excessive display as with FIG. 8.

Figure 10:
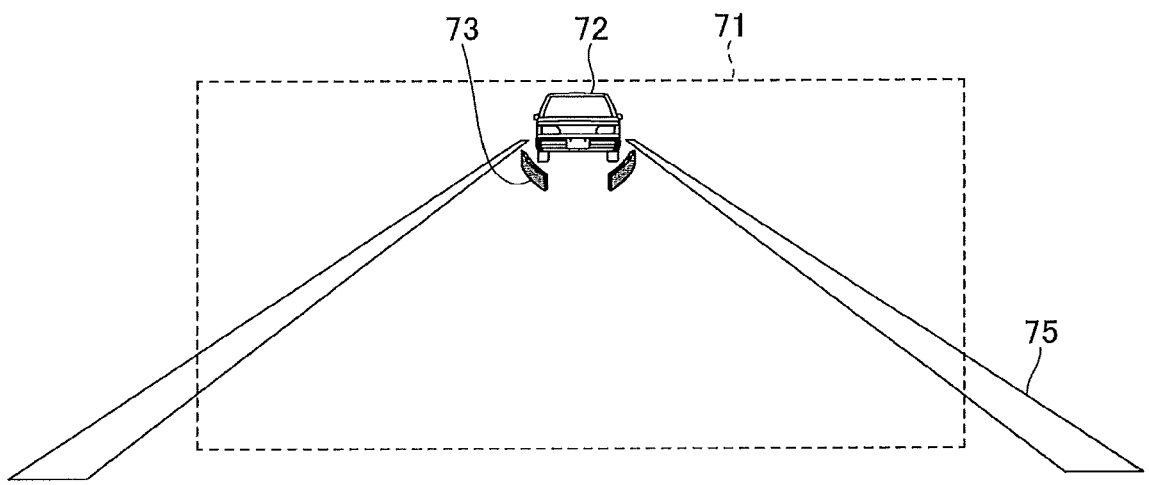
FIG. 10 is a diagram (part 1) for explaining a change in luminance of the virtual image caused by a difference in the depth of the superimposed position in the scene.

FIG. 10 is a diagram for explaining a change in luminance of the virtual image caused by a difference in the depth of the superimposed position in the scene. Similarly to FIGS. 6 through 9, FIG. 10 illustrates an exemplary situation in which the marker, which follows the preceding vehicle of the reference vehicle when viewed from the viewer (driver) through the HUD, is projected as the virtual image.

In FIG. 10, the degree of the change in luminance of the superimposed marker 73 is changed at the same degree (the rate of change) as the degree of the change in depth of the preceding vehicle 72, such that the degree of the change in luminance of the marker 73 is changed in accordance with the degree of the change in depth of the preceding vehicle 72 (noting that the width in the horizontal direction and the width in the vertical direction of the marker 73 are controlled in the same manner as in FIG. 7).

Figure 11:
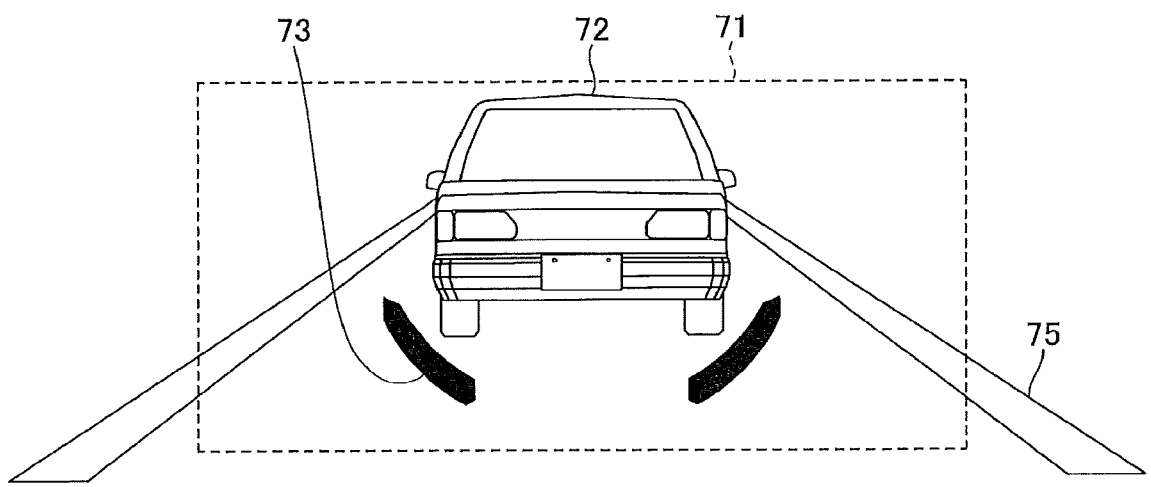
FIG. 11 is a diagram (part 2) for explaining a change in luminance of the virtual image caused by a difference in the depth of the superimposed position in the scene.

In FIG. 11, the degree of the change in luminance of the superimposed marker 73 is made larger than the degree of the change in depth of the preceding vehicle 72, such that the rate of change in luminance of the marker 73 increases. As a result, the luminance of the marker 73 illustrated in FIG. 11 is made higher than that of the marker 73 illustrated in FIG. 10 (noting that the width in the horizontal direction and the width in the vertical direction of the marker 73 are controlled in the same manner as FIG. 9). Further, in FIG. 10 and FIG. 11, high luminance is expressed in black for convenience.

In this way, by adjusting luminance of the marker 73 in accordance with the degree of depth of the superimposed position in the scene, a sense of perspective of the preceding vehicle being followed can be appropriately expressed.

As illustrated in FIG. 10, when the preceding vehicle 72 is located far from the reference vehicle, and is thus determined as having a low priority of being perceived, it is effective to make the luminance low so as not to hinder the display of other virtual images having higher priorities. Conversely, as illustrated in FIG. 11, when the preceding vehicle 72 is located near to the reference vehicle and may have a possibility of a collision, it is effective to make the luminance high such that the driver can easily visually identify the risk of the collision.

However, in a case where the depth of a scene position at which to superimpose a virtual image is greater (for example, the depth of a scene position at which to superimpose a virtual image is greater than a threshold TH2, which will be described later), the luminance of the virtual image may be controlled so as not to become less than or equal to a specific value, regardless of the degree of the change in depth. This avoids incorrect identification. If luminance of a virtual image, which is located far away and thus having a low priority, is set too low, the virtual image may be incorrectly identified as trash on a road surface for example.

Further, the shape of the marker as illustrated in FIGS. 6 through 11 is not necessarily changed, for example, enlarged or reduced, in accordance with depth of a superimposed position in a scene. Taking a triangular marker 74 as an example, additional explanation will be provided with reference to FIGS. 12A and 12B.

Figures 12A, 12B:
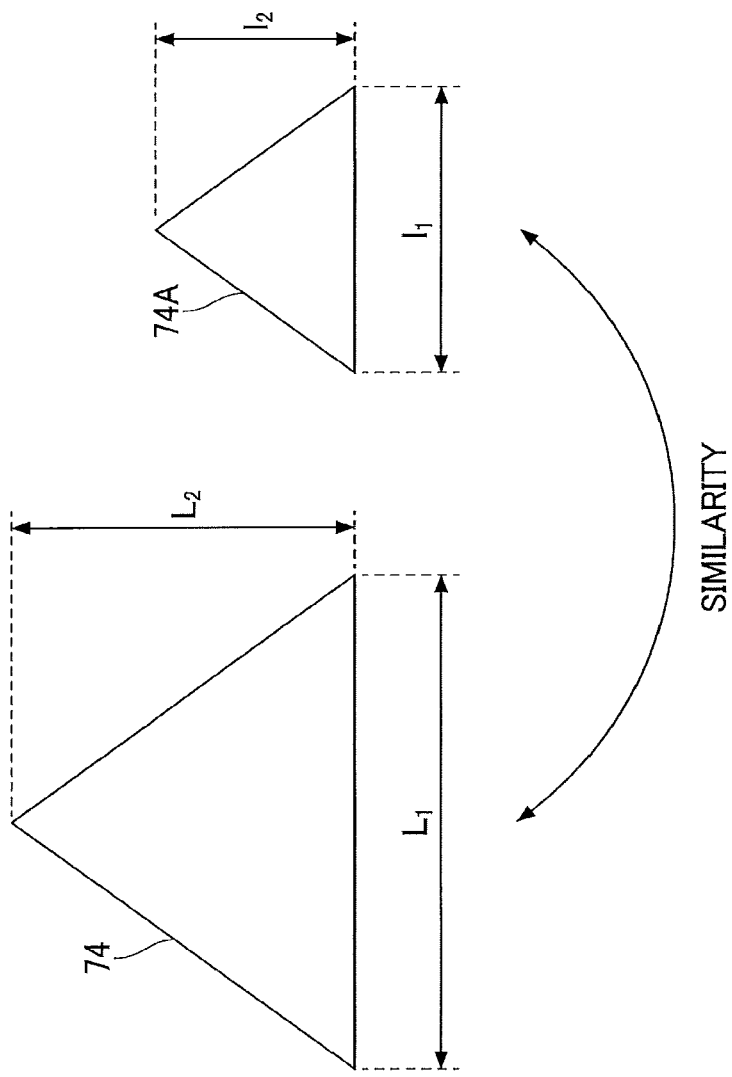
FIGS. 12A and 12B are diagrams for each explaining a change in formation of a maker with respect to a change in the depth of the superimposed position in the scene.

FIG. 12A illustrates a triangular marker 74 as a virtual image displayed when the depth of a superimposed position in a scene is smaller, and also illustrates a triangular marker 74A as a virtual image displayed when the depth of the superimposed position in the scene is greater. The marker 74A and the marker 74 in FIG. 12A are in a similarity relation to each other.

FIG. 12B illustrates a case in which a shape of the triangular marker 74B is not changed similarly to a degree of change in depth of the superimposed position in the scene. In FIG. 12B, a width $l_1$ in a horizontal direction becomes larger as the depth becomes greater, and the width $l_1$ becomes smaller as the depth becomes smaller, such that the shape is changed in accordance with perspective. Conversely, a width $l_2'$ in a vertical direction does not depend on the degree of change in perspective depth and is maintained so as not to become less than or equal to a specific size.

As described, a method for changing a shape of a marker is not limited to a method for changing, for example, enlarging or reducing, the shape of the marker in accordance with a degree of change in depth.

Further, in FIGS. 6 through 11, although an example in which, as the marker 73, a symbol that follows the vehicle in front of the reference vehicle is illustrated, the marker 73 is not limited to the symbol that follows the vehicle in front of the reference vehicle. For example, the marker 73 may be an arrow that indicates a route for guiding to a destination. Further, the number of virtual images to be displayed is not necessarily a single virtual image, and a plurality of virtual images may be displayed. In this case, a virtual image that three-dimensionally matches a real object existing around the reference vehicle when viewed from the viewer, and a virtual image that does not three-dimensionally match a real object when viewed from the viewer may be simultaneously displayed in the display area 71.

FIG. 13 is a graph for explaining a correlation between a degree of change in depth of a scene position and a degree of change in shape of a virtual image. Similarly to FIGS. 6 through 11, FIG. 13 illustrates an exemplary situation in which a marker, which follows the preceding vehicle of the reference vehicle when viewed from the viewer (driver) through the HUD, is projected as a virtual image.

In FIG. 13, a horizontal axis represents a degree of change in depth and a vertical axis represents a degree of change in shape. The degree of the change in shape of the virtual image is expressed only by enlarging or reducing the virtual image.

First, upon the degree of the change in depth being within a range from a smaller-depth threshold TH1 to the greater-depth threshold TH2 (including the threshold TH1 and the threshold TH2), the degree of the change in shape is changed in proportion to (in accordance with) the degree of the change in depth in the same manner as a conventional method, based on the assumption that the driver's visibility does not decrease. Namely, upon the depth of the scene position at which to superimpose the virtual image becoming greater than or equal to the threshold TH1 and less than or equal to the threshold TH2, a part of or the entirety of a degree of change in the virtual image to be displayed is controlled in accordance with the degree of the change in depth.

Also, upon the degree of the change in depth being within a range between the smallest depth of the virtual image presented to the driver and the smaller-depth threshold TH1, the degree of the change in shape is maintained until reaching the threshold TH1, such that the virtual image is displayed differently from the degree of the change in depth. This prevents the virtual image from being excessively enlarged and the driver's attention from being attracted more than necessary.

Further, upon the degree of the change in depth being within a range between the greater-depth threshold TH2 and the greatest depth of the virtual image presented to the driver, the degree of the change in shape is maintained after reaching the threshold TH2, such that the virtual image is displayed differently from the degree of the change in depth. This prevents the virtual image from being excessively reduced and avoids a difficulty in visually identifying the virtual image.

In this way, in the information display apparatus 1, a degree of change in a control portion (such as a dimension in the vertical direction and luminance) of a virtual image to be superimposed is controlled differently from a degree of change in a scene perspectively viewed in front of a vehicle, making it possible to display the virtual image without impairing a viewer's visibility. Accordingly, even if the degree of the change in the scene perspectively viewed in front of the vehicle is large, the virtual image can be displayed in such a manner that does not disturb the perception of the viewer.

Specifically, upon the degree of the change in depth being outside a predetermined range (i.e., upon the depth of the scene position at which to superimpose the virtual image is smaller than the threshold TH1 and greater than the threshold TH2), a degree of change in a part or the entirety of the virtual image to be displayed is controlled differently from the degree of the change in depth. Also, upon the degree of the change in depth being within the predetermined range (i.e., upon the depth of the scene position at which to superimpose the virtual image is greater than or equal to the threshold TH1 and less than or equal to the threshold TH2), the degree of the change in the virtual image to be displayed is controlled in accordance with the degree of the change in depth.

Note that a degree of change in depth can be obtained by inputting, into the information input unit 800, information such as distance information received from the information acquisition unit 5. Width dimensions and luminance of the marker 73 can be controlled by the data adjusting unit 8210 based on the input information. Alternatively, by inputting information from the GPS into the information input unit 800, the width dimensions and luminance of the marker 73 may be controlled by the data adjusting unit 8210 based on the input information.

For example, a table corresponding to the graph of FIG. 13 may be stored in the ROM 203 such that the data adjusting unit 8210 may control the width dimensions and luminance of the marker 73 based on the input information and the table stored in the ROM 203.

The above-described control of a degree of change in depth of a scene and a virtual image includes, when the control is regarded as an operation of the information display apparatus 1 alone separately from the scene, changing a geometric shape of an image to be displayed when moving an image projected onto the front windshield 910 in an up-and-down direction. Alternatively, the above-described control includes changing luminance of the image to be displayed when moving the image projected onto the front windshield 910 in the up-and-down direction. Alternatively, the above-described control includes changing both the geometric shape and the luminance of the image to be displayed when moving the image projected onto the front windshield 910 in the up-and-down direction.

Further, upon a change in the geometric shape of the image to be displayed being made when the image projected onto the front windshield 910 is moved in the up-and-down direction, the degree of the change in the geometric shape with respect to the amount of movement (corresponding to the horizontal axis in FIG. 13) of the image in the up-and-down direction may be partially different as illustrated in FIG. 13. For example, the degree of the change in the geometric shape may be different according to the amount of movement being greater than or equal to the threshold TH1 and less than or equal to the threshold TH2, being greater than the threshold TH1, or being less than the threshold TH2. In FIG. 13, a portion of the graph less than the threshold TH1 and a portion of the graph greater than the threshold TH2 may each have a gentler slope than that of a portion greater than or equal to the threshold TH1 and less than or equal to the threshold TH2. As used herein, the up-and-down direction is determined by the direction of gravity.

[Reception of Object Information]

The information display apparatus 1 determines an image to be displayed based on a viewpoint position of a viewer, a position of a virtual image, a distance between the viewpoint and the virtual image, a size of the virtual image, and a range in which to superimpose the virtual image. For example, when the virtual image is superimposed on a road surface, a position and a distance at which to superimpose the virtual image are determined, and the virtual image is geometrically converted such that the virtual image can be viewed as existing at the target position and the distance when viewed from the viewpoint of the viewer.

When the virtual image is assumed to be displayed on a flat road surface, the virtual image can be displayed by performing the geometric conversion only. Conversely, when the virtual image is displayed on a non-flat road surface such as a curved road surface and a sloped road surface, or when the virtual image is displayed between white lines on a road surface, object information is required to be obtained. The object information includes, for example, coordinates of a position (position information) on a road surface on which to superimpose a virtual image. Further, when a virtual image is superimposed on an object such as a preceding vehicle and a pedestrian, the object information refers to position information of the object. Further, the object information may be information related to other objects.

For example, by using laser radar as the information acquisition unit 5, position information can be obtained as object information. The laser radar is a device configured to emit a laser beam and receive reflected light (scattered light) from an object (for example, a preceding vehicle, a stopped vehicle, a building, and a pedestrian), such that position information (a distance to the object and coordinates of the object) can be measured.

A stereo camera may be used as the information acquisition unit 5. The stereo camera includes a camera unit for the left eye and a camera unit for the right eye, and may calculate three-dimensional position information of an object based on a parallax image obtained from the camera units.

The information display apparatus 1 causes the information input unit 800 to receive object information (for example, three-dimensional position information of an object) from the information acquisition unit 5, and sends the received object information to the image data generating unit 820. The image data generating unit 820 adjusts parameters (at least one of an image forming position, a size, a shape, a color, and brightness of a virtual image) of display information (the virtual image) based on the object information. When the display information that three-dimensionally matches a real object is displayed, the parameters of the virtual image are preferably adjusted such that a sense of perspective can be set in line with a position, a shape, and a size of the real object.

Further, the information display apparatus 1 may cause the information input unit 800 to receive information and traffic rules) and weather information, and may display the received information as a virtual image in such a manner that three-dimensionally matches a real object.

Further, the information display apparatus may cause the information input unit 800 to receive position information of a reference vehicle, for example, and may display the received information as a virtual image in such a manner that three-dimensionally matches a real object. The position information of the reference vehicle may be received from a device equipped with the GPS (for example, a car navigation system).

According to an aspect of at least one embodiment, it is possible to provide an information display apparatus that can display a virtual image without impairing a viewer's visibility.

Although the embodiments have been specifically described above, the present invention is not limited to the above-described embodiments and may be applied when displaying and presenting various types of information to a viewer. Various modifications and variations may be made without departing from the scope of the present invention.

What is claimed is:

1. An information display apparatus for irradiating a transmissive reflection member with light for forming an image so as to make a virtual image of the image visible on the transmissive reflection member, the information display apparatus comprising:
    a memory; and
    a processor coupled to the memory and configured to control, upon a change in depth of a scene position at which to superimpose the virtual image, a degree of change in a part or an entirety of the virtual image to be displayed, differently from a degree of the change in depth,
    wherein, upon the degree of the change in depth being outside a predetermined range, the degree of the change in the part or the entirety of the virtual image to be displayed is controlled differently from the degree of the change in depth, and
    wherein, upon the degree of the change in depth being within the predetermined range, the degree of the change in the part or the entirety of the virtual image to be displayed is controlled in accordance with the degree of the change in depth.

2. The information display apparatus according to claim 1, wherein a shape of the virtual image is controlled.

3. The information display apparatus according to claim 1, wherein luminance of the virtual image is controlled.

4. The information display apparatus according to claim 1, wherein, upon the degree of the change in depth being small or great, a value indicating a degree of change in shape is made constant.

5. The information display apparatus according to claim 1, wherein, upon the degree of the change in depth being outside the predetermined range, a degree of change in a dimension in a vertical direction of the virtual image is controlled so as to be larger than the degree of the change in depth, and a degree of change in a dimension in a horizontal direction of the virtual image is controlled in accordance with the degree of the change in depth.

6. The information display apparatus according to claim 1, wherein, upon the degree of the change in depth being outside the predetermined range, luminance of the virtual image is controlled so as not to become less than or equal to a specific value regardless of the degree of the change in depth.

7. The information display apparatus according to claim 1, wherein the virtual image is made visible to a viewer who is an occupant of a moving object.

8. The information display apparatus according to claim 7, wherein a virtual image that three-dimensionally matches a real object existing around the moving object when viewed from the viewer is displayed in a display area capable of displaying the virtual image.

9. The information display apparatus according to claim 8, wherein the virtual image that three-dimensionally matches the real object existing around the moving object when viewed from the viewer, and a virtual image that does not three-dimensionally match the real object when viewed from the viewer are simultaneously displayed in the display area.

10. The information display apparatus according to claim 8, comprising information input circuitry configured to receive object information that is information related to the real object existing around the moving object.

11. The information display apparatus according to claim 10, wherein at least one of a position, a size, a shape, a color, and brightness of the virtual image is adjusted based on the object information.

12. The information display apparatus according to claim 10, wherein the object information includes at least one of a position, a size, a shape, a color, and brightness of the real object.

13. The information display apparatus according to claim 10, wherein
the information input circuitry is further configured to receive traffic information related to the moving object, and
the traffic information is displayed as the virtual image in the display area based on the object information such that the traffic information three-dimensionally matches the real object when viewed from the viewer.

14. The information display apparatus according to claim 10, wherein
the information input circuitry is further configured to receive position information of the moving object, and
the virtual image is displayed in the display area based on the position information such that the virtual image three-dimensionally matches the real object when viewed from the viewer.

15. An information display apparatus for projecting an image onto a transmissive reflection member so as to make a virtual image of the image visible, the information display apparatus comprising:
a memory; and
a processor coupled to the memory and configured to make a change in a geometric shape of the image upon moving the image in an up-and-down direction,
wherein the processor is further configured to control, upon a change in depth of a scene position at which to superimpose the virtual image, a degree of change in a part or an entirety of the virtual image to be displayed, differently from a degree of the change in depth,
wherein, upon the degree of the change in depth being outside a predetermined range, the degree of the change in the part or the entirety of the virtual image to be displayed is controlled differently from the degree of the change in depth, and
wherein, upon the degree of the change in depth being within the predetermined range, the degree of the change in the part or the entirety of the virtual image to be displayed is controlled in accordance with the degree of the change in depth.

16. The information display apparatus according to claim 15, wherein degrees of the change in the geometric shape with respect to an amount of movement in the up-and-down direction of the image differ in parts.

17. The information display apparatus according to claim 15, wherein the change in the geometric shape is a change in a ratio of a vertical direction to a horizontal direction of the image.

18. An information display apparatus for projecting an image onto a transmissive reflection member so as to make a virtual image of the image visible, the information display apparatus comprising:
a memory; and
a processor coupled to the memory and configured to make a change in luminance of the image upon moving the image in an up-and-down direction,
wherein the processor is further configured to control, upon a change in depth of a scene position at which to superimpose the virtual image, a degree of change in a part or an entirety of the virtual image to be displayed, differently from a degree of the change in depth,
wherein, upon the degree of the change in depth being outside a predetermined range, the degree of the change in the part or the entirety of the virtual image to be displayed is controlled differently from the degree of the change in depth, and
wherein, upon the degree of the change in depth being within the predetermined range, the degree of the change in the part or the entirety of the virtual image to be displayed is controlled in accordance with the degree of the change in depth.

* * * * *